Figure 1:
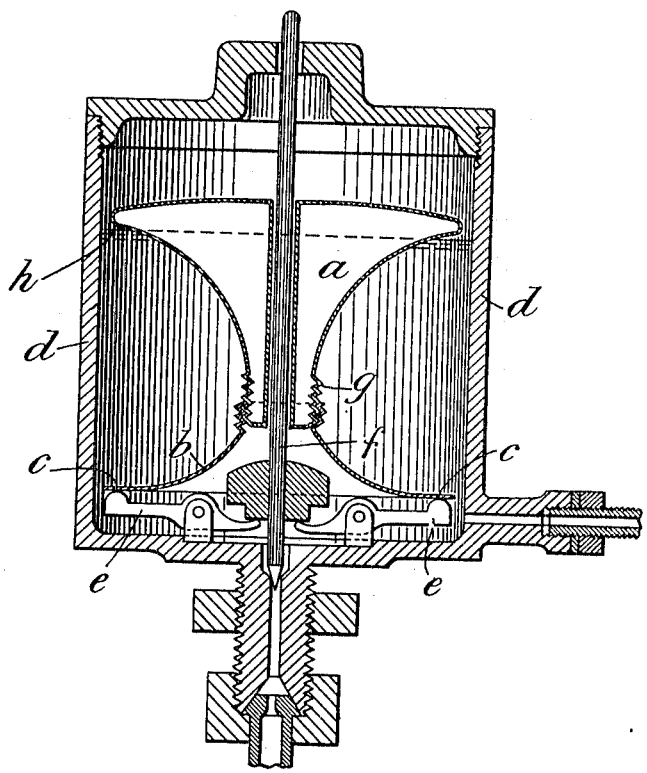

W. GILLETT.
CARBURETER FOR INTERNAL COMBUSTION ENGINES.
APPLICATION FILED AUG. 29, 1908.

1,106,091.

Patented Aug. 4, 1914.

Witnesses:
P. F. Nagle.
L. Douville.

Inventor
Walter Gillett.
by Wiedersheim Fairbanks
Attorneys.

UNITED STATES PATENT OFFICE.

WALTER GILLETT, OF LONDON, ENGLAND.

CARBURETER FOR INTERNAL-COMBUSTION ENGINES.

1,106,091.  Specification of Letters Patent.  Patented Aug. 4, 1914.

Application filed August 29, 1908. Serial No. 450,803.

*To all whom it may concern:*

Be it known that I, WALTER GILLETT, a subject of the King of England, residing at London, E. C., in England, have invented a certain new and useful Improvement in or Relating to Carbureters for Internal-Combustion Engines, of which the following is a specification.

This invention comprises improvements in or relating to carbureters for internal combustion engines and more particularly to floats for use therein whereby firstly the hydrocarbon may be kept at a much more uniform level in the float-chamber than hitherto by imparting greater sensitiveness of action to the float, and secondly to enable such floats to be adjustable according to the level of hydrocarbon at which it is desired to work in the float chamber without its being necessary to adjust the inlet needle or valve by altering its position in the counter-balance weight as is the usual practice.

According to the first part of this invention I dispense with the cylindrical or other form of float usually adopted and form the float of inverted conical, conoidal or pyramidal shape or otherwise of such shape that the capacity or cross-sectional area is reduced in a downward direction for a distance extending over all possible differences of liquid level. The variation of liquid level in a device of this character is usually confined between quite definite limits, the normal maximum being determined by the inclination of the carbureter which shall cause excess of liquid to flow to the float chamber from other portions of the carbureter, as well as by the height at which the float will close the inlet valve securely irrespective of shocks or jolts; and the normal minimum liquid level being determined by the reverse inclination of the device, by the sensitiveness of the valve, and by the comparative rates of outflow and inflow underload. By the use of a float of this form as compared with a cylindrical float or one having vertical upwardly converging walls on fall of level of the liquid in the float chamber, a proportionately greater section of said conical float becomes unimmersed and thus unsupported by liquid in proportion to the vertical upwardly diverging inclination of the wall or walls of the float from the vertical, and this unsupported or unbalanced portion thus affords an increase of dead weight or downwardly acting force to be exerted upon the operating lever or levers of the inlet valve thus creating a quicker action of same by more rapidly overcoming the inertia thereof and consequently causing said valve to respond more quickly than with the use of a cylindrical float. By this means the level is more rapidly restored to the normal and the carbureter rendered more sensitive.

According to the second part of the invention I provide the float with relatively adjustable parts, preferably by screwing a flanged part into or onto the float proper, so that by simply screwing these parts closer together or farther apart the effective distance of the float from the parts in connection with which it is to operate is reduced or increased respectively.

Examples of construction of the invention are represented in the accompanying drawing in which—

Figure 2:
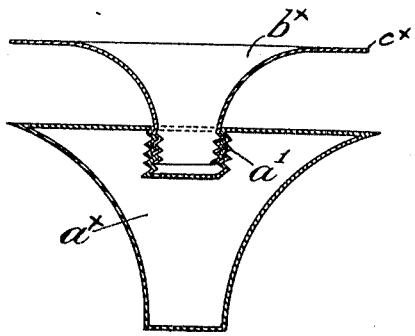

Figure 1 shows my improved float in a carbureter. Fig. 2 illustrates a modification in the position of the flanged attachment.

The float and its adjunctive part may consist of two cones $a$ and $b$ one or both of which may be truncated with their apices directed toward each other and having a common axis, the lower part $b$ or the one which is practically always immersed having at its lower edge an annular or circumferential flange $c$ which acts on the levers $e$ controlling the movement of the needle valve $f$ and the edge of which lies close to the wall of the float chamber $d$. The provision of this flange is also intended to reduce or prevent oscillation or "bobbing" of the float in the liquid. The line $h$ shows the approximate maximum liquid level relatively to the float. The upper cone $a$ or float proper or buoyant portion may be screwed to the lower cone as at $g$. This, however, is but one of the various forms that may be employed.

Fig. 2 shows a modification for use when the levers are above instead of below the float. In this case the top of the cone or float proper $a^x$ has a screwed socket $a^1$ into which the cone $b^x$ is screwed the flange $c^x$ of the latter being designed to act on the valve levers in the same manner as the flange $c$ of the cone $b$ acts upon the levers $e$ in the form shown in Fig. 1.

What I claim as my invention and desire to secure by Letters Patent of the United States is:—

1. In a carbureter, the combination, with the float chamber and means for control of inlet thereto, of a float having bearing upon said inlet controlling means, said float being formed of adjustably united sections and diminished in cross sectional capacity between the normal maximum and normal minimum level of the liquid for the purpose set forth.

2. In a carbureter, the combination, with the float chamber and means for control of inlet thereto, of a float diminished in cross sectional capacity in a downward direction and a flange adjustably attached to said float having bearing upon said inlet controlling means.

3. In a carbureter, the combination, with the float chamber and means for control of inlet thereto, of a float diminished in cross sectional capacity in a downward direction and a flange screw threaded upon said float having bearing upon said inlet controlling means.

4. In a float valve, the combination, with a liquid containing receptacle having an inlet and means for controlling said inlet, of a float adapted to be buoyed up by the liquid in said receptacle, and connections between said float and said inlet controlling means whereby said inlet is closed when the liquid level has reached a predetermined height, said float being diminished in cross-sectional capacity in a downward direction and such variation in capacity being most pronounced in the neighborhood of the maximum liquid level.

In witness whereof I have signed this specification in the presence of two witnesses.

WALTER GILLETT.

Witnesses:
EUSTACE H. BARKER,
JOHN J. NEWPORT.

Copies of this patent may be obtained for five cents each, by addressing the "Commissioner of Patents, Washington, D. C."